United States Patent
Hara (10) Patent No.: US 12,323,083 B2
(45) Date of Patent: Jun. 3, 2025

(54) MOTOR CONTROL DEVICE AND MOTOR DRIVER CIRCUIT

(71) Applicants: Kabushiki Kaisha Toshiba, Tokyo (JP); Toshiba Electronic Devices & Storage Corporation, Tokyo (JP)

(72) Inventor: Takehiro Hara, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 106 days.

(21) Appl. No.: 18/172,932

(22) Filed: Feb. 22, 2023

(65) Prior Publication Data

US 2024/0097586 A1    Mar. 21, 2024

(30) Foreign Application Priority Data

Sep. 21, 2022 (JP) ................... 2022-150514

(51) Int. Cl.
| | |
|---|---|
| *H02P 6/18* | (2016.01) |
| *H02K 11/21* | (2016.01) |
| *H02K 11/27* | (2016.01) |
| *H02K 11/33* | (2016.01) |
| *H02P 6/30* | (2016.01) |

(52) U.S. Cl.
CPC ............. *H02P 6/18* (2013.01); *H02K 11/21* (2016.01); *H02K 11/27* (2016.01); *H02K 11/33* (2016.01); *H02P 6/30* (2016.02); *H02K 2213/03* (2013.01)

(58) Field of Classification Search
CPC ...... H02P 6/18; H02P 6/30; H02P 6/16; H02P 6/182; H02K 11/21; H02K 11/27; H02K 11/33; H02K 2213/03
USPC ................... 318/400.32, 400.01, 700
See application file for complete search history.

(56) References Cited

U.S. PATENT DOCUMENTS

| | | | |
|---|---|---|---|
| 8,421,396 B2 * | 4/2013 | Yamada | G05B 7/02 318/254.1 |
| 9,242,566 B2 * | 1/2016 | Harada | B60L 58/21 |
| 10,581,365 B2 | 3/2020 | Hatakeyama | |
| 10,944,344 B2 * | 3/2021 | Kaidu | H02P 6/16 |
| 2017/0163199 A1 | 6/2017 | Park | |
| 2018/0226913 A1 | 8/2018 | Hatakeyama | |

FOREIGN PATENT DOCUMENTS

JP        2020108254 A        7/2020

* cited by examiner

*Primary Examiner* — David Luo
(74) *Attorney, Agent, or Firm* — Kim & Stewart LLP (57) ABSTRACT

According to one embodiment, a motor control device includes a sensor, a detection circuit, and a controller. The sensor is at a position between a winding of a first phase and a winding of a second phase in a motor. The motor includes windings of three phases. The detection circuit detects when a magnitude relationship between an induced voltage amplitude of the first phase and an induced voltage amplitude of the second phase is switched. The controller performs based on a sensor signal from the sensor and a detection result sensor from the detection circuit.

18 Claims, 10 Drawing Sheets

| TARGET ROTATION DIRECTION | HALL SIGNAL | COMPARATOR COMPARISON RESULT | DETECTED ROTATION DIRECTION |
|---|---|---|---|
| CW | H | H | FORWARD ROTATION |
| CW | H | L | REVERSE ROTATION |
| CW | L | H | REVERSE ROTATION |
| CW | L | L | FORWARD ROTATION |
| CCW | H | H | REVERSE ROTATION |
| CCW | H | L | FORWARD ROTATION |
| CCW | L | H | FORWARD ROTATION |
| CCW | L | L | REVERSE ROTATION |

MOTOR CONTROL DEVICE AND MOTOR DRIVER CIRCUIT

CROSS-REFERENCE TO RELATED APPLICATION(S)

This application is based upon and claims the benefit of priority from Japanese Patent Application No. 2022-150514, filed Sep. 21, 2022, the entire contents of which are incorporated herein by reference.

FIELD

Embodiments described herein relate generally to a motor control device and a motor driver circuit.

BACKGROUND

A motor control device may perform predetermined processing in addition to normal driving. In this case, it is desired to perform the predetermined processing with high accuracy.

DETAILED DESCRIPTION

Embodiments provide a motor control device and a motor driver circuit that can accurately perform processing related to operational adjustments and delay time and rotation direction detection.

In general, according to one embodiment, a motor control device includes a sensor, a detection circuit, and a controller. The sensor is at a position between a winding of a first phase and a winding of a second phase in a motor. The detection circuit detects when a magnitude relationship between a signal corresponding to an induced voltage amplitude of the first phase and another signal corresponding an induced voltage amplitude of the second phase is switched. The controller performs processing based on a sensor signal from the sensor and a detection result signal from the detection circuit.

Motor control devices according to certain example embodiments will be described below with reference to the accompanying drawings. The present disclosure is not limited by these particular example embodiments.

First Embodiment

Figure 1:
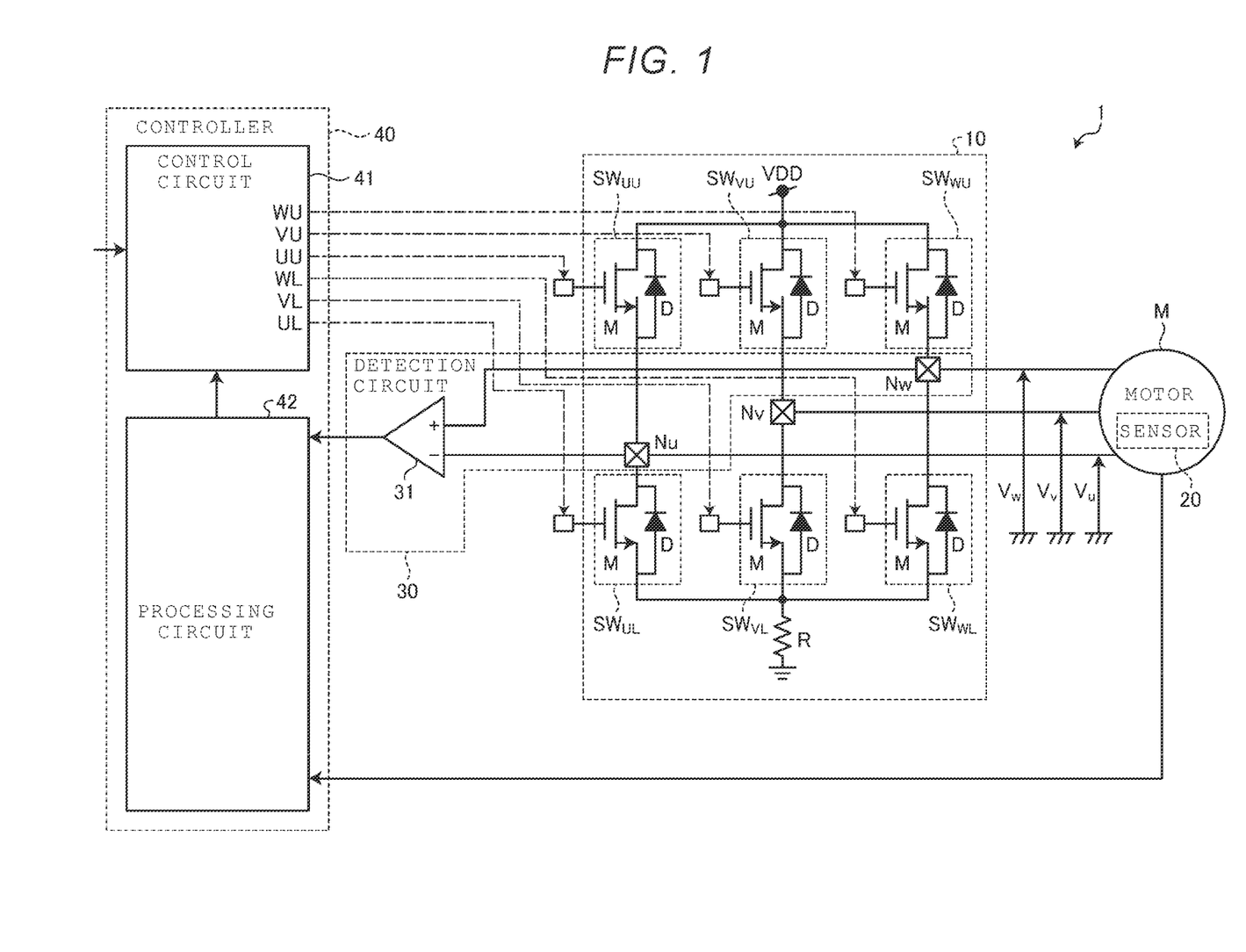
FIG. 1 is a diagram illustrating a configuration of a motor control device according to a first embodiment.

A motor control device according to a first embodiment accurately performs certain adjustment processing in addition to processing for normal driving operations. A motor control device 1 in this example is configured as illustrated in FIG. 1.

The motor control device 1 controls the driving of a motor M. The motor control device 1 is also called a motor driver circuit in some contexts. The motor M may be a three-phase AC motor. The motor control device 1 drives the motor M by supplying AC power of three phases (U-phase, V-phase, W-phase).

The motor control device 1 includes a drive circuit 10, a sensor 20, a detection circuit 30, and a controller 40. The drive circuit 10 is connected between the motor M and the detection circuit 30 and controller 40. The detection circuit 30 is connected between the controller 40 and the drive circuit 10.

The drive circuit 10 is, for example, an inverter. The drive circuit 10 converts DC power into AC power and drives the motor M by supplying the converted AC power to the motor M. The drive circuit 10 includes a plurality of switching elements SW. When the motor M is a three-phase AC motor, the drive circuit 10 includes switching elements SWUU, SWVU, SWWU, SWUL, SWVL, and SWWL corresponding to the three phases (U-phase, V-phase, W-phase). The switching elements SWUU, SWVU, and SWWU form an upper arm. The switching elements SWUL, SWVL, and SWWL form a lower arm.

The motor M may have a configuration in which each stator ST is an electromagnet and a rotor is a permanent magnet, or a configuration in which each stator ST is a permanent magnet and the rotor is an electromagnet. In the following example, in the motor M, each stator ST is an electromagnet and the rotor is a permanent magnet.

Figure 2:
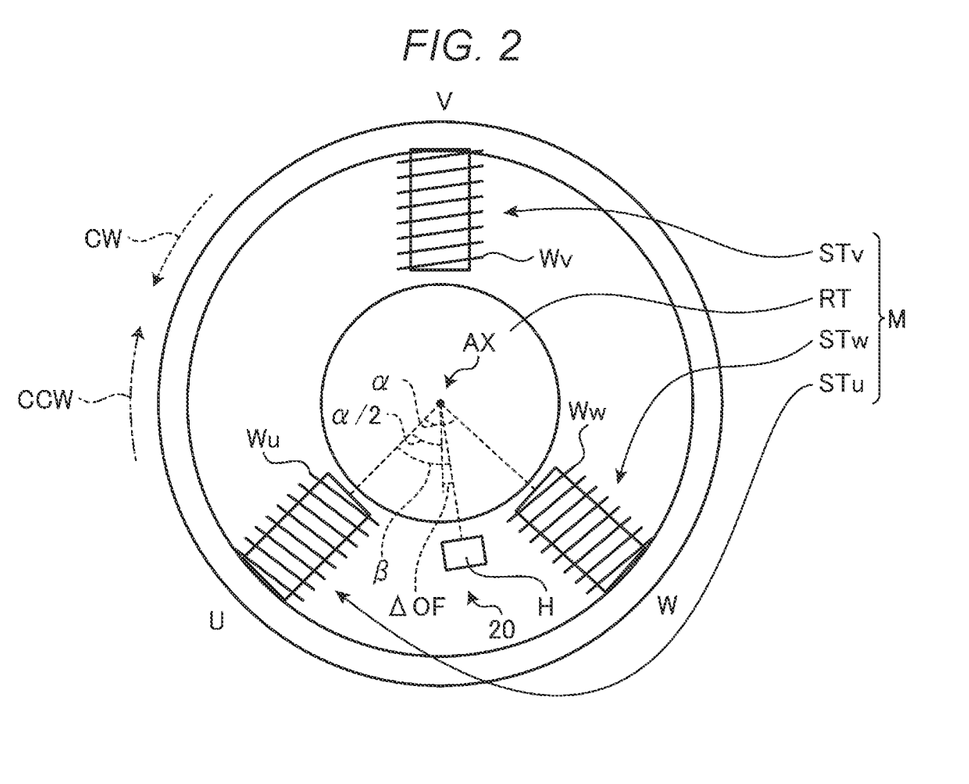
FIG. 2 is a diagram illustrating a configuration of a motor and a sensor in a first embodiment.

The motor M includes stators STU, STV, and STW and a rotor RT, as illustrated in FIG. 2. FIG. 2 is a diagram illustrating a configuration of the motor M and the sensor 20, and schematically shows a cross section including a rotation axis of the motor M. FIG. 2 illustrates a cross section viewed from a front side (power transmission destination side).

The stator STU includes a U-phase winding WU. The stator STV includes a V-phase winding WV. The stator STW includes a W-phase winding WW. A rotor RT includes n pole pairs including north and south poles, where n is an integer of 1 or more. Regarding the rotation direction of the rotor RT, a rotation direction CW (clockwise) and a rotation direction CCW (counterclockwise) is set as depicted in FIG. 2.

A node NU (illustrated in FIG. 1) is connected to the U-phase winding WU of the motor M. A node NV (illustrated in FIG. 1) is connected to the V-phase winding WV of the motor M. A node NW (illustrated in FIG. 1) is connected to the W-phase winding WW of the motor M.

The switching elements SWUU and SWUL each correspond to the U phase and respectively have one end connected to the node NU. The switching element SWUU has another end connected to a power supply voltage VDD. The switching element SWUL has another end connected to a ground voltage via a resistor element R.

The switching elements SWVU and SWVL each correspond to the V phase and respectively have one end connected to the node NV. The switching element SWVU has another end connected to the power supply voltage VDD. The switching element SWVL has the another connected to the ground voltage via the resistor element R.

The switching elements SWWU and SWWL each correspond to the W phase and respectively have one end connected to the node NW. The switching element SWWU has another end connected to the power supply voltage VDD. The switching element SWWL has another end connected to the ground voltage via the resistor element R.

The sensor 20 (illustrated in FIG. 1) detects a rotational position of the motor M. That is, the sensor 20 detects a position (rotational position) of the rotor RT. The sensor 20 may include a Hall element H (see FIG. 2) and use this Hall element H to detect the rotational position of the rotor RT.

For example, the Hall element H is located at a position between two phase windings Wu and Ww of the three phase windings Wu, Wv, and Ww in the motor M, as illustrated in FIG. 2. A level of a Hall signal output from the Hall element H changes when a magnetic pole boundary of the rotor RT passes through the sensor position between the two phase windings Wu and Ww.

As a result, the sensor 20 can detect the timing at which the magnetic pole boundary of the rotor RT passes through the sensor position between the two phase windings Wu and Ww (2n times per a single rotation of the rotor RT). When the number of pole pairs is one (n=1), the sensor 20 twice detects the magnetic pole boundary of the rotor RT passing through the position between the two phase windings Wu and Ww during one rotation of the rotor RT.

The detection circuit 30 (illustrated in FIG. 1) detects when a magnitude relationship between a signal of one phase (a first phase) and a signal of another phase (a second phase) is switched. In some examples, the detection circuit 30 may detect the timing at which a magnitude relationship between an induced voltage amplitude of one phase and an induced voltage amplitude of another phase is switched. The detection circuit 30 may detect the timing at which a magnitude relationship between an amplitude of a W-phase induced voltage VW and an amplitude of a U-phase induced voltage VU is switched.

The detection circuit 30 may include a comparator 31 and a plurality of detection nodes. The comparator 31 compares the induced voltage detected at the detection node of one phase with the induced voltage detected at the detection node of another phase. The comparator 31 may compare the induced voltage VW detected at the W-phase detection node NW and the induced voltage VU detected at the U-phase detection node NU. The comparator 31 has a non-inverting input node (+) connected to the W-phase detection node NW, an inverting input node (−) connected to the U-phase detection node NU, and an output node connected to the controller 40. The comparator 31 supplies a comparison result to the controller 40. A level of the comparison result is inverted at the timing at which a magnitude relationship between the W-phase induced voltage amplitude and the U-phase induced voltage amplitude switches. The comparator 31 can indicate the timing at which the magnitude relationship between the induced voltage amplitude of one phase and the induced voltage amplitude of another phase switches by an edge timing at which the comparison result is inverted (switches).

The controller 40 performs adjustment processing on the motor M based on the signal from the sensor 20 and the detection result from the detection circuit 30 during a maintenance period such as at a startup. The adjustment processing may be related to any adjustment that makes driving of the motor M more efficient. The controller 40 drives and controls the motor M based on the signal from the sensor 20 in a normal operating state after the adjustment processing is performed. Thereby, the controller 40 can more efficiently control the motor M.

The controller 40 includes a control circuit 41 and a processing circuit 42. The control circuit 41 drives and controls the motor M. The processing circuit 42 calculates an offset amount and a delay amount based on the signal from the sensor 20 and the detection result from the detection circuit 30.

The offset amount indicates an amount of deviation from a midpoint position between the winding of one phase and the winding of another phase for the arrangement position of the sensor 20 (Hall element H) in terms of electrical angle (electrical phase angle). For example, in the case of FIG. 2, when the arrangement position of the U-phase winding WU is used as a reference position, the arrangement position of the W-phase winding WW at an angle α from the reference position, and the midpoint position is at an angle α/2. The arrangement position of the Hall element H is at an angle β. An offset amount ΔOF, which indicates the amount of deviation between the midpoint position and the arrangement position of the Hall element H in terms of an electrical (phase) angle, is expressed by Equation 1 below:

$$\Delta OF = \beta - \alpha/2$$

A delay amount ΔD indicates as an electrical angle how much the edge timing of the signal of the sensor 20 is delayed from a proper timing. The delay amount ΔD mainly includes an operation delay of the Hall element H, a delay of the wiring connecting the Hall element H and the processing circuit 42, an operation delay of the circuit in the processing circuit 42, and the like.

The processing circuit 42 notifies the control circuit 41 of the offset amount ΔOF and the delay amount ΔD. The control circuit 41 drives and controls the motor M after correction according to the offset amount ΔOF and the delay amount ΔD.

Figure 3:
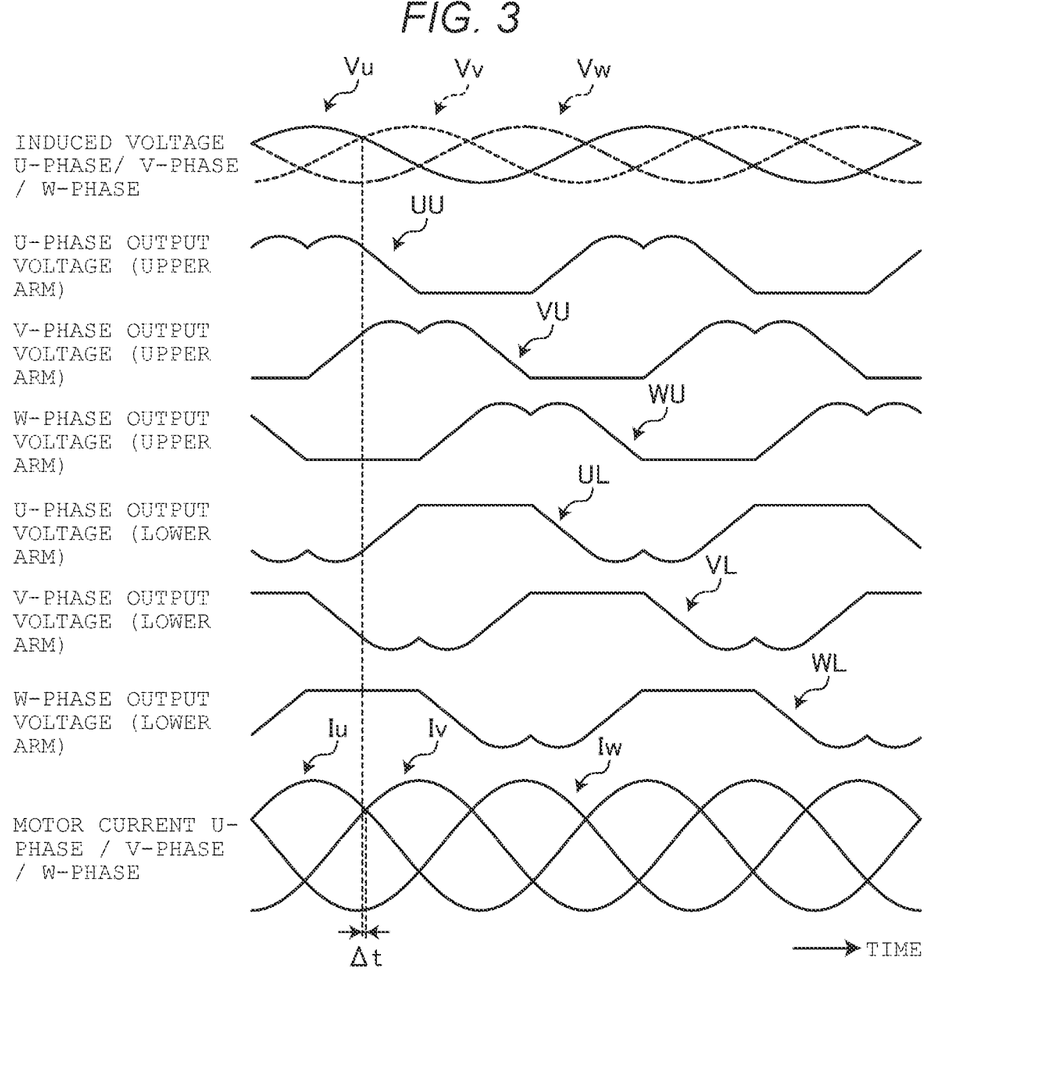
FIG. 3 is a waveform diagram illustrating an operation of the motor control device according to a first embodiment.

The control circuit 41 drives and controls the motor M as in the normal operating state. The control circuit 41 drives and controls the motor M in the rotation direction CW. The control circuit 41 supplies the U-phase output voltage UU, the V-phase output voltage VU, the W-phase output voltage WU, the U-phase output voltage UL, the V-phase output voltage VL, and the W-phase output voltage WL, as illustrated in FIG. 3, to control terminals of the switching elements SWUU, SWVU, SWWU, SWUL, SWVL, and SWWL, respectively. FIG. 3 is a waveform diagram illustrating the operation of the motor control device 1.

The phases of the U-phase output voltage UU, the V-phase output voltage VU, and the W-phase output voltage WU are sequentially offset by about +120°. The phases of the U-phase output voltage UU and the U-phase output voltage UL are offset by about 180°. The phases of the V-phase output voltage VU and the V-phase output voltage VL are offset by about 180°. The phases of the W-phase output voltage WU and the W-phase output voltage WL are offset by about 180°. As a result, the switching elements SWUU, SWVU, SWWU, SWUL, SWVL, and SWWL are switching-controlled on and off as necessary.

Accordingly, a U-phase motor current IU, a V-phase motor current IV, and a W-phase motor current IW flow with a phase difference of about +120° from each other, and are respectively supplied to the U-phase winding Wu, the V-phase winding Wv, and the W-phase winding Ww. As a result, the rotor RT rotates in the rotation direction CW, and the U-phase induced voltage VU, the V-phase induced voltage VV, and the W-phase induced voltage VW are generated with a phase difference of about +120°. The U-phase induced voltage VU, the V-phase induced voltage VV, and the W-phase induced voltage VW change according to the rotational position of the rotor RT.

Figure 4:
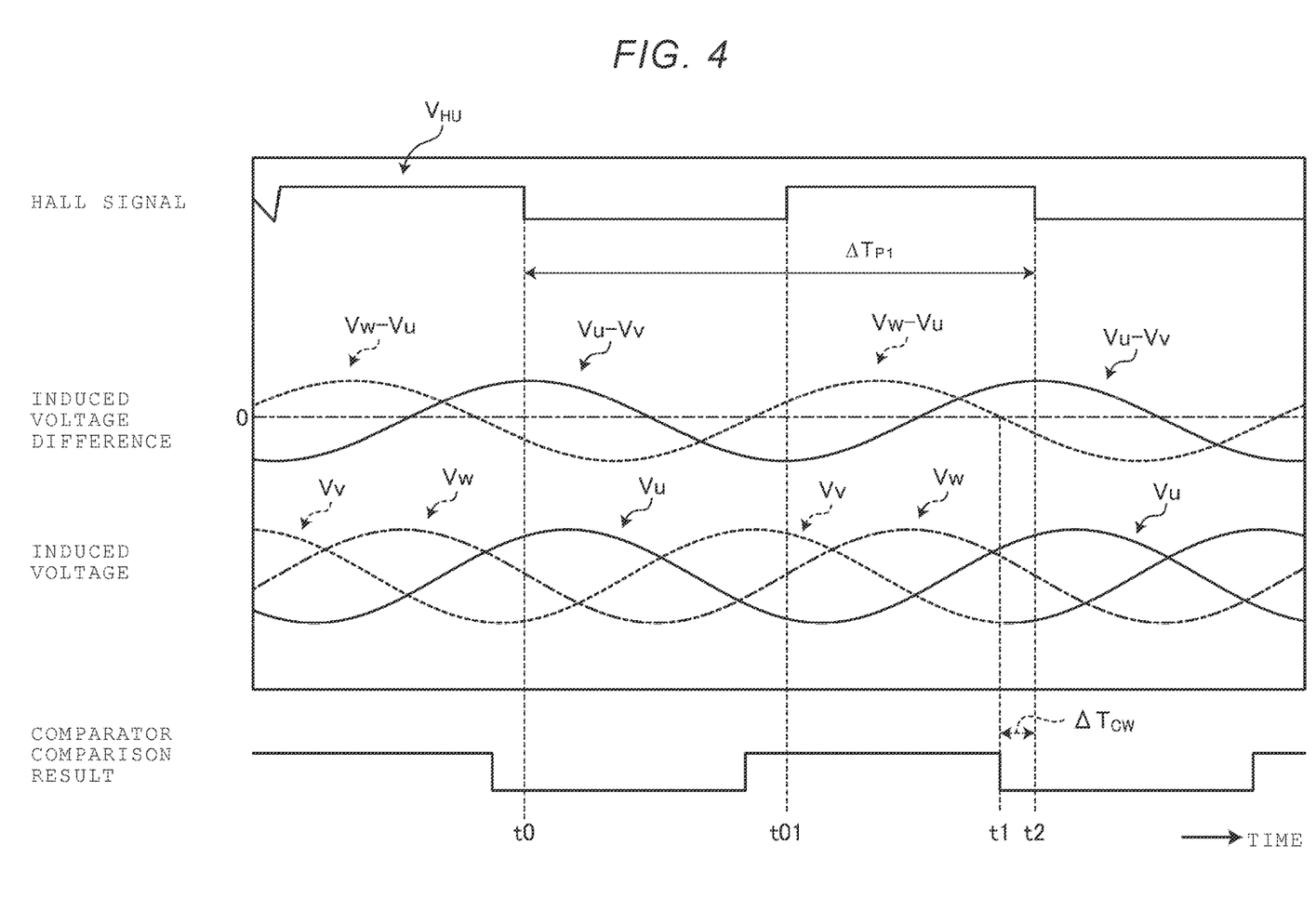
FIG. 4 is a diagram related to measurement of a delay time in a first rotation direction in a first embodiment.

Then, the control circuit 41 stops driving of the motor M. In this case, the rotor RT continues initially to rotate in the rotation direction CW at a substantially constant rotational speed due to its inertia. As a result, as illustrated in FIG. 4, the U-phase induced voltage VU, the V-phase induced voltage VV, and the W-phase induced voltage VW are continuously generated with a phase difference of about +120°. FIG. 4 is a diagram illustrating the measurement of a delay time ΔTCW in the rotation direction CW.

In this state, the sensor 20 detects the rotational position of the rotor RT and supplies a detection result to the processing circuit 42. The Hall element H supplies a Hall signal as illustrated in FIG. 4 to the processing circuit 42. The level of the Hall signal output from the Hall element H changes when the magnetic pole boundary of the rotor RT passes through the sensor position between the two phase windings Wu and Ww. For example, the Hall signal transitions from H level to L level at a time t0, transitions from L level to H level at a time t01, and transitions from H level to L level at a time t2. When the number of pole pairs is one (n=1), a period ΔTP1 from the time t0 to the time t2 corresponds to one cycle of the Hall signal and also corresponds to the period over which the rotor RT rotates once in the rotation direction CW.

The detection circuit 30 detects the timing at which the magnitude relationship between the induced voltage amplitude of one phase and the induced voltage amplitude of another phase is switched, and supplies the detection result to the processing circuit 42. The comparator 31 compares the W-phase induced voltage VW and the U-phase induced voltage VU, and inverts the comparison result at the timing when the magnitude relationship between the amplitude of the W-phase induced voltage VW and the amplitude of the U-phase induced voltage VU is switched.

For example, the comparison result from the comparator 31 transitions from H level to L level at a time t1. This timing is the timing of transition from a state in which the induced voltage VW is greater than the induced voltage VU to a state in which the induced voltage VW is less than the induced voltage VU. In addition, this timing is the timing of the zero cross in terms of a waveform of a difference VW-VU between the induced voltage VW and the induced voltage VU. A waveform of a difference VU-VV is illustrated for reference.

The processing circuit 42 obtains the time t0 and the time t2 according to the Hall signal output from the sensor 20. The processing circuit 42 obtains the time t1 according to the comparison result from the detection circuit 30. According to these signals, the processing circuit 42 calculates a period ΔTP1 (length of time from t0 to t2), and obtains the delay time ΔTCW from the time t1 to the time t2.

Also, the control circuit 41 drives and controls the motor M in the rotation direction CCW. The rotation direction CCW is a rotation direction opposite to the rotation direction CW. Although not illustrated, the control circuit 41 generates the U-phase output voltage UU, the V-phase output voltage VU, and the W-phase output voltage WU so that their phases are offset by about −120° in order, and supplies them to the switching elements SWUU, SWVU, and SWWU, respectively. The control circuit 41 generates the U-phase output voltage UU and the U-phase output voltage UL so that the phases thereof are offset by about 180° from each other, and supplies them to the switching elements SWUU and SWUL. The control circuit 41 generates the V-phase output voltage VU and the V-phase output voltage VL so that phases thereof are offset from each other by about 180°, and supplies them to the switching elements SWVU and SWVL. The control circuit 41 generates the W-phase output voltage WU and the W-phase output voltage WL so that the phases thereof are offset from each other by about 180°, and supplies them to the switching elements SWWU and SWWL. As a result, the switching elements SWUU, SWVU, SWWU, SWUL, SWVL, and SWWL are controlled for switching.

Accordingly, a U-phase motor current IU, a V-phase motor current IV, and a W-phase motor current IW flow with a phase difference of about −120° from each other, and are supplied to the U-phase winding Wu, the V-phase winding Wv, and W-phase winding Ww, respectively. As a result, the rotor RT rotates in the rotation direction CCW, and the U-phase induced voltage VU, the V-phase induced voltage VV, and the W-phase induced voltage VW are generated with a phase difference of about −120°. The U-phase induced voltage VU, the V-phase induced voltage VV, and the W-phase induced voltage VW change according to the rotational position of the rotor RT.

Figure 5:
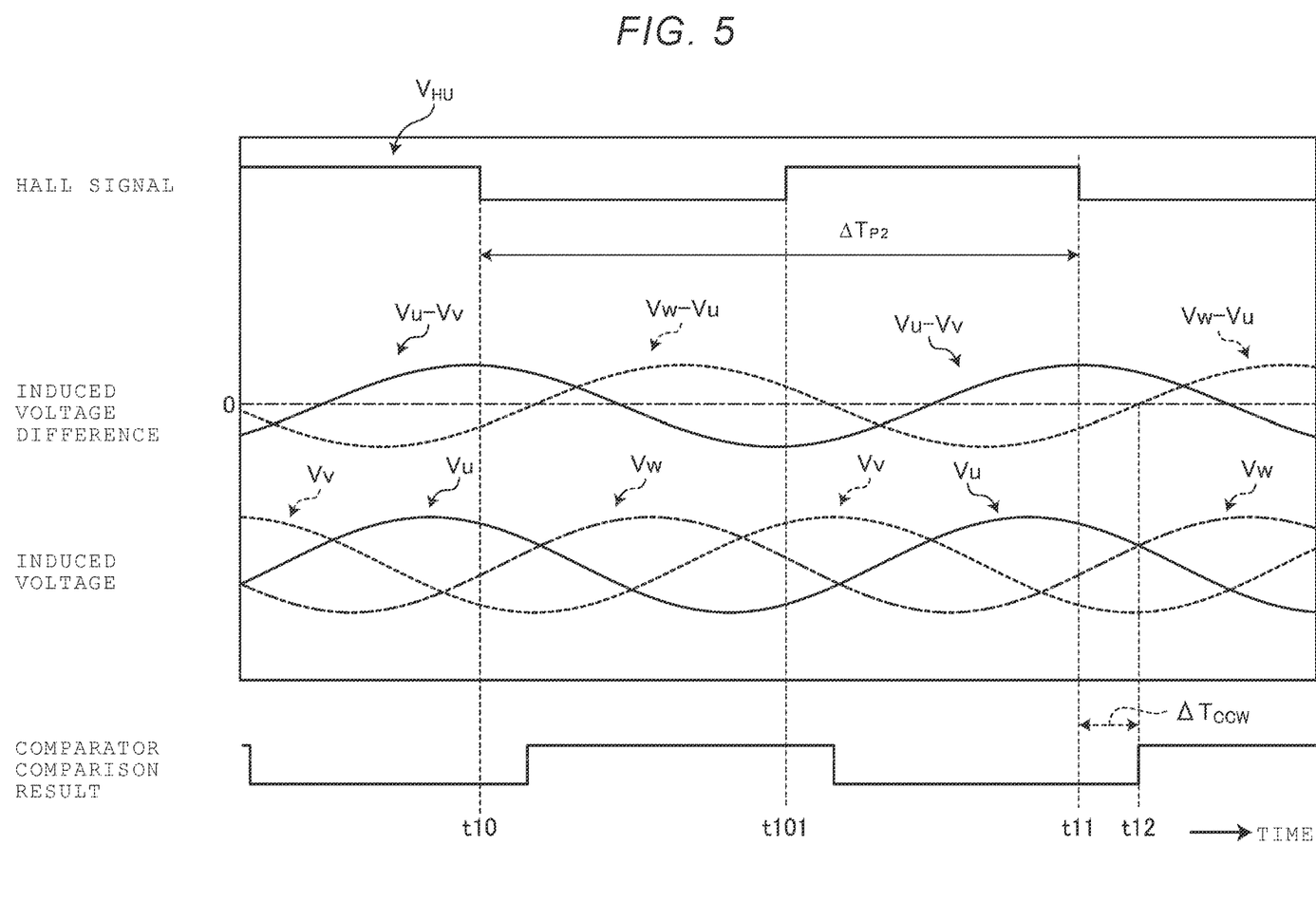
FIG. 5 is a diagram related to measurement of a delay time in a second rotation direction in a first embodiment.

Then, the control circuit 41 stops driving of the motor M. In this case, the rotor RT rotates in the rotation direction CCW at a substantially constant rotational speed due to its inertia. As a result, as illustrated in FIG. 5, the U-phase induced voltage VU, the V-phase induced voltage VV, and the W-phase induced voltage VW are continuously generated with a phase difference of about −120°. FIG. 5 is a diagram illustrating the measurement of a delay time ΔTCCW in the rotation direction CCW.

In this state, the sensor 20 detects the rotational position of the rotor RT and supplies the detection result to the processing circuit 42. For example, the Hall element H supplies a Hall signal as illustrated in FIG. 5 to the processing circuit 42. The level of the Hall signal output from the Hall element H changes at the timing when the magnetic pole boundary of the rotor RT passes through the position between two phase windings Wu and Ww. For example, the Hall signal transitions from H level to L level at a time t10, transitions from L level to H level at a time t101, and transitions from H level to L level at a time t11. When the number of pole pairs is one (n=1), a period ΔTP2 from the time t10 to the time t11 is one cycle of the Hall signal and corresponds to the period during which the rotor RT rotates once in the rotation direction CCW.

The detection circuit 30 detects the timing at which the magnitude relationship between the induced voltage amplitude of one phase and the induced voltage amplitude of another phase is switched, and supplies the detection result to the processing circuit 42. The comparator 31 compares the W-phase induced voltage VW and the U-phase induced voltage VU, and inverts the comparison result at the timing when the magnitude relationship between the amplitude of the W-phase induced voltage VW and the amplitude of the U-phase induced voltage VU is switched.

For example, the comparison result from the comparator 31 transitions from L level to H level at a time t12. This timing is the timing of transition from a state in which the induced voltage VW is lower than the induced voltage VU to a state in which the induced voltage VW is higher than the induced voltage VU. In addition, this timing is the timing of the zero cross in terms of the waveform of the difference VW-VU between the induced voltage VW and the induced voltage VU. The waveform of the difference VU-VV is illustrated for reference.

The processing circuit 42 obtains the time t10 and the time t11 according to the Hall signal from the sensor 20. The processing circuit 42 obtains the time t12 according to the comparison result from the detection circuit 30. According to these, the processing circuit 42 calculates a period ΔTP2 from t10 to t11, and obtains the delay time ΔTCCW from the time t11 to the time t12.

Here, the offset amount ΔOF is an angle indicating the displacement of the arrangement position of the sensor 20 (Hall element H). Since the offset amount ΔOF is a physical quantity that depends on the rotation direction of the rotor RT, it is contained in the delay time with the sign inverted between the rotation direction CW and the rotation direction CCW. Therefore, the processing circuit 42 can calculate the offset amount ΔOF (in units of degree°) by the following Equation 2 (below) using the delay time ΔTCW in the rotation direction CW and the delay time ΔTCCW in the rotation direction CCW. Equation 2 is as follows:

$$\Delta OF=(360\times\Delta TCW/TP1-360\times\Delta TCCW/TP2)/2$$

The delay amount ΔD is a deviation due to the operation delay of the Hall element H, the delay of the wiring connecting the Hall element H and the processing circuit 42, the operation delay of the circuit in the processing circuit 42, and the like. Since the delay amount ΔD is a physical quantity that does not depend on the rotation direction of the rotor RT, it is contained in the delay time with the same sign in the rotation direction CW and the rotation direction CCW. Therefore, the processing circuit 42 can calculate the delay amount ΔD (in units of degree°) by Equation 3 (below) using the delay time ΔTCW in the rotation direction CW and the delay time ΔTCCW in the rotation direction CCW. Equation 3 is as follows:

$$\Delta D=(360\times\Delta TCW/TP1+360\times\Delta TCCW/TP2)/2$$

As a result, during a maintenance period such as at startup, the controller 40 can perform adjustment processing for correcting the offset amount ΔOF calculated by Equation 2 and the delay amount ΔD obtained by Equation 3 for the signal (Hall signal) of the sensor 20. In a state where this adjustment processing is performed, the controller 40 drives and controls the motor M based on the signal from the sensor 20 in a normal state. Thereby, the controller 40 can efficiently control the motor M.

In the first embodiment, the controller 40 calculates the offset amount and the delay amount based on the signal from the sensor 20 and the detection result from the detection circuit 30 during the maintenance period. For example, the controller 40 drives the motor M in the rotation direction CW, maintains states of all the switching elements to OFF states, and measures the delay time ΔTCW in the rotation direction CW. The controller 40 also drives the motor M in the rotation direction CCW, maintains states of all the switching elements to the OFF states, and measures the delay time ΔTCCW in the rotation direction CCW. The controller 40 uses the delay time ΔTCW and the delay time ΔTCCW to obtain the offset amount and the delay amount. Since the delay times ΔTCW and ΔTCCW measured while the rotational speed of the motor M is steady are used, the offset amount and the delay amount can be obtained with high accuracy.

It is possible to calculate the offset amount from a Hall signal of one phase and the induced voltage corresponding to the current flowing in a lower output stage of the one phase. If it is assumed that the upper switching elements SWVU and SWWU of the V/W phases in the drive circuit 10 are turned off and the lower switching elements SWVL and SWWL are turned on, then the offset amount can be detected so that the time from fall of the U-phase Hall signal to fall of the U-phase induced voltage becomes the time corresponding to an electrical angle of 150°. In this case, a braking operation on the rotation of the rotor RT occurs due to turning-on of the switching elements SWVL and SWWU. As a result, the U-phase induced voltage changes, and the fall timing thereof tends to deviate from the timing corresponding to the offset amount. This makes it difficult to accurately detect the offset amount.

However, in the first embodiment, the controller 40 drives the motor M in the rotation direction CW, maintains the states of all the switching elements to be the OFF states, and measures the delay time ΔTCW in the rotation direction CW. Also, the controller 40 drives the motor M in the rotation direction CCW, maintains the states of all the switching elements to be the OFF states, and measures the delay time ΔTCCW in the rotation direction CCW. The controller 40 uses the delay time ΔTCW and the delay time ΔTCCW to calculate the offset amount and the delay amount. This eliminates the need for a braking operation at the time of detection, thereby reducing the occurrence of changes in the induced voltage at the time of detection. Therefore, it becomes easier to accurately detect the offset amount.

The arrangement position of the Hall element H is not limited to the position illustrated in FIG. 2. For example, the Hall element H may be located between two phase windings Wu and WV of the three phase windings Wu, Wv and Ww in the motor M. In this case, the detection circuit 30 may detect the timing at which the magnitude relationship between the amplitude of the U-phase induced voltage VU and the amplitude of the V-phase induced voltage VV is switched. The comparator 31 may compare the induced voltage VU detected at the U-phase detection node NU and the induced voltage VV detected at the V-phase detection node NV. The comparator 31 has a non-inverting input node (+) connected to the U-phase detection node NU, an inverting input node (−) connected to the V-phase detection node NV, and an output node connected to the controller 40.

Alternatively, the Hall element H may be located at a position between two phase windings WV and WW of the three phase windings Wu, Wv and Ww in the motor M. In this case, the detection circuit 30 may detect the timing at which the magnitude relationship between the amplitude of the V-phase induced voltage VV and the amplitude of the W-phase induced voltage VW is switched. The comparator 31 may compare the induced voltage VV detected at the V-phase detection node NV and the induced voltage VW detected at the W-phase detection node NW. The comparator 31 has a non-inverting input node connected to the V-phase detection node NV, an inverting input node connected to the W-phase detection node NW, and an output node connected to the controller 40.

Figure 6:
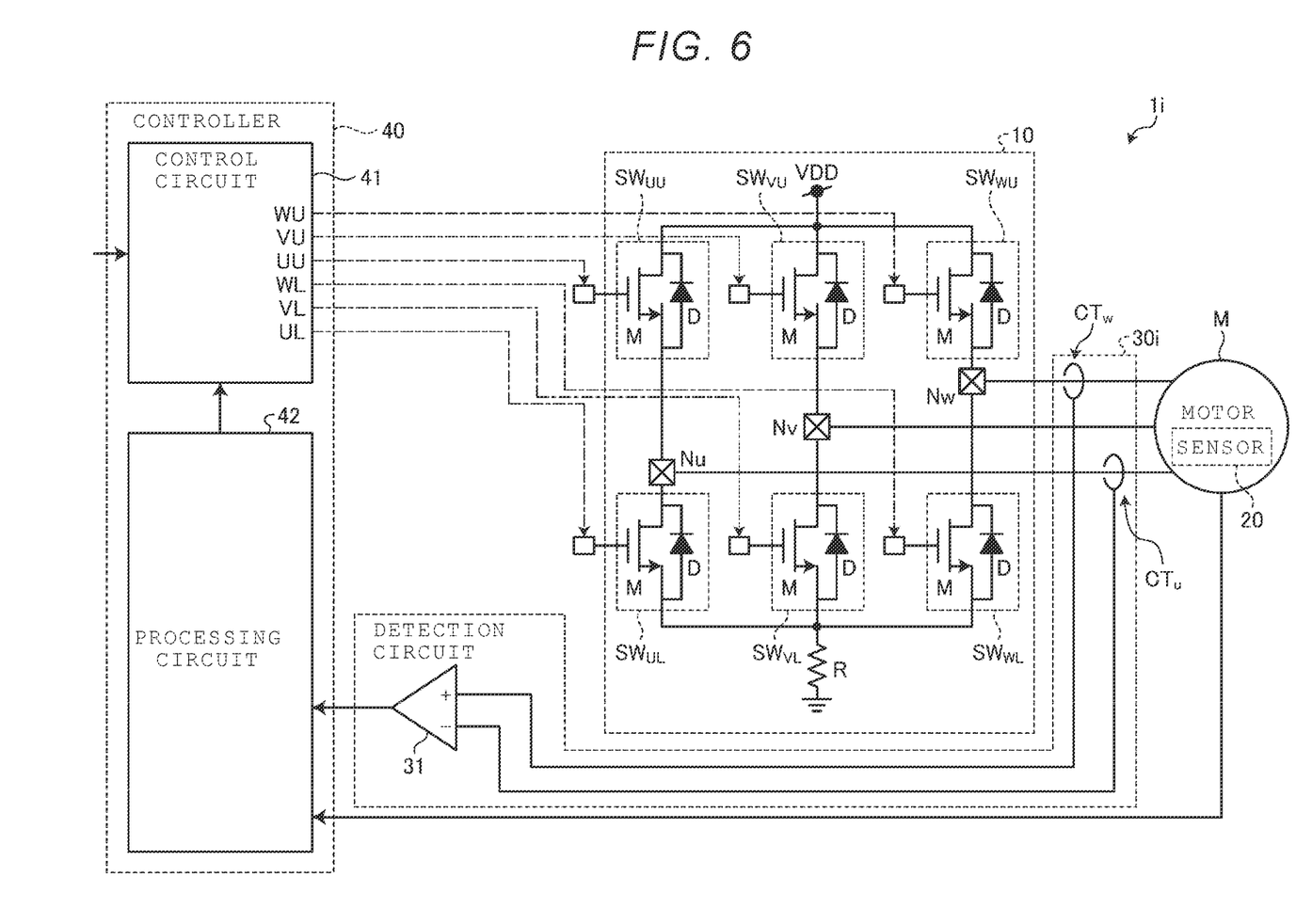
FIG. 6 is a diagram illustrating a configuration of a motor control device according to a modification of a first embodiment.

Also, as a modification example of the first embodiment, a detection circuit 30*i* in a motor control device 1*i*, as illustrated in FIG. 6, may be configured to detect the timing at which the magnitude relationship of motor currents of a plurality of phases is switched instead of the timing at which the magnitude relationship of induced voltages of a plurality of phases is switched. FIG. 6 is a diagram illustrating a configuration of the motor control device 1*i* according to this modification of the first embodiment.

The detection circuit 30*i* may detect the timing at which the magnitude relationship between the motor current of one phase and the motor current of another phase is switched. The detection circuit 30i may detect the timing at which the magnitude relationship between the amplitude of the W-phase motor current IW and the amplitude of the U-phase motor current IU is switched.

The detection circuit 30i may include a comparator 31 and current detectors CTw and CTU. The comparator 31 compares the motor current I detected by the current detector one phase to the motor current I detected by the current detector of another phase. For example, the comparator 31 may compare a motor current IW detected by a W-phase current detector CTW and a motor current IU detected by a U-phase current detector CTU. The comparator 31 has a non-inverting input node connected to the W-phase current detector CTW, an inverting input node connected to the U-phase current detector CTU, and an output node connected to the controller 40. The comparator 31 supplies a comparison result to the controller 40. A level of the comparison result is inverted (switched) when the magnitude relationship between the W-phase motor current IW and the U-phase motor current IU switches. The comparator 31 can detect the timing at which the magnitude relationship between the motor current I of one phase and the motor current I of another phase switches by the edge timing at which the comparison result is inverted.

Here, as illustrated in FIG. 3, with respect to the timing at which the magnitude relationship between the induced voltage amplitude of one phase and the induced voltage amplitude of another phase is switched, the timing at which the magnitude relationship between the motor current of one phase and the motor current of another phase is switched has a deviation Δt. In some examples, timing deviation Δt may be experimentally measured and stored in the processing circuit 42 in advance of the adjustment processing. When the processing circuit 42 calculates the timing at which the magnitude relationship between the motor current I of one phase and the motor current I of another phase is switched, the timing may be corrected by the deviation Δt. As a result, since the processing circuit 42 can obtain the timing at which the magnitude relationship between the induced voltage amplitude of one phase and the induced voltage amplitude of another phase is switched, the offset amount and the delay amount can be obtained with high accuracy.

Second Embodiment

Next, a motor control device 1 according to a second embodiment will be described. The following description will focus on aspects that are different from those of the first embodiment.

In the first embodiment, the calculating of the offset amount and the delay amount for adjustment processing was performed separately from the normal operation driving (e.g., in a startup period or the like). In the second embodiment the detection of the rotation direction occurs when the motor is idling (not being driven).

For example, when the motor M is a fan motor, even in a state in which driving by the motor control device 1 is not performed, the fan may rotate due to wind or otherwise, and the motor M to which such rotational force is imparted may be caused to rotate, resulting in movement during idling. When the motor M is idling, if the motor control device 1 does not know the present rotation direction of the motor M, it becomes difficult to drive-control the motor M in the appropriate (intended) rotation direction. Therefore, in the motor control device 1, it is desired to appropriately detect the rotation direction of the motor M even while idling.

Figure 7:
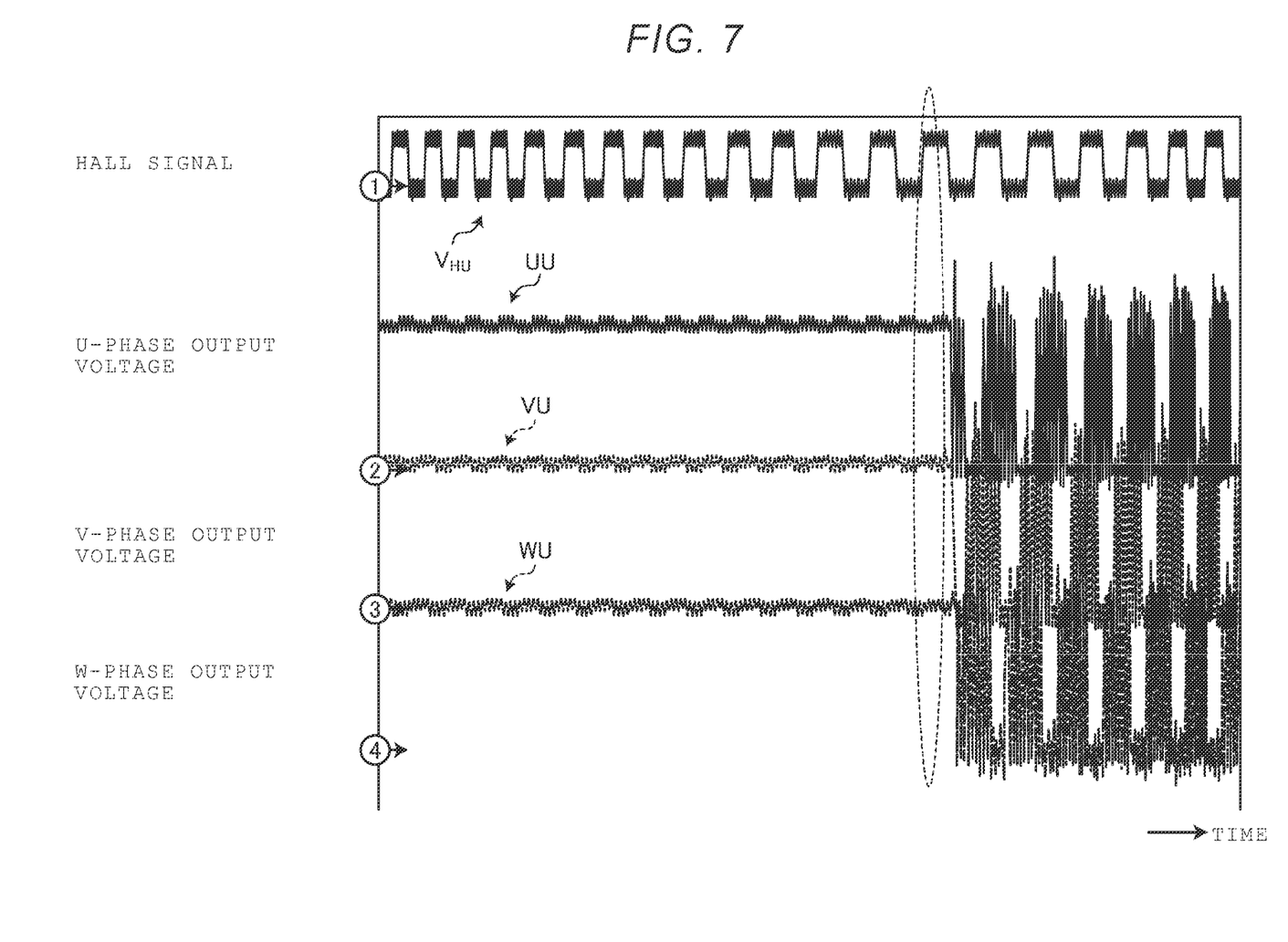
FIG. 7 is a waveform diagram illustrating an operation of a motor control device according to a second embodiment.

In the motor control device 1 illustrated in FIG. 1, the controller 40 calculates the rotation direction of the motor M based on the signal from the sensor 20 and the detection result from the detection circuit 30. The controller 40 detects the rotation direction of the motor M when it is idling while the U-phase output voltage UU, the V-phase output voltage VU, and the W-phase output voltage WU are at high impedance, as indicated by the dotted line surrounded region in FIG. 7. FIG. 7 is a waveform diagram illustrating an operation of the motor control device 1.

Even when the U-phase output voltage UU, the V-phase output voltage VU, and the W-phase output voltage WU are at high impedance, as when the motor M is idling, a U-phase induced voltage VU, a V-phase induced voltage VV, and a W-phase induced voltage VW can still be generated. For example, when the motor M is moving in the rotation direction CW while idling, the U-phase induced voltage VU, the V-phase induced voltage VV, and the W-phase induced voltage VW are generated as illustrated in FIG. 4. When the motor M is moving in the rotation direction CCW while idling, a U-phase induced voltage VU, a V-phase induced voltage VV, and a W-phase induced voltage VW are generated as illustrated in FIG. 5.

Figure 8:
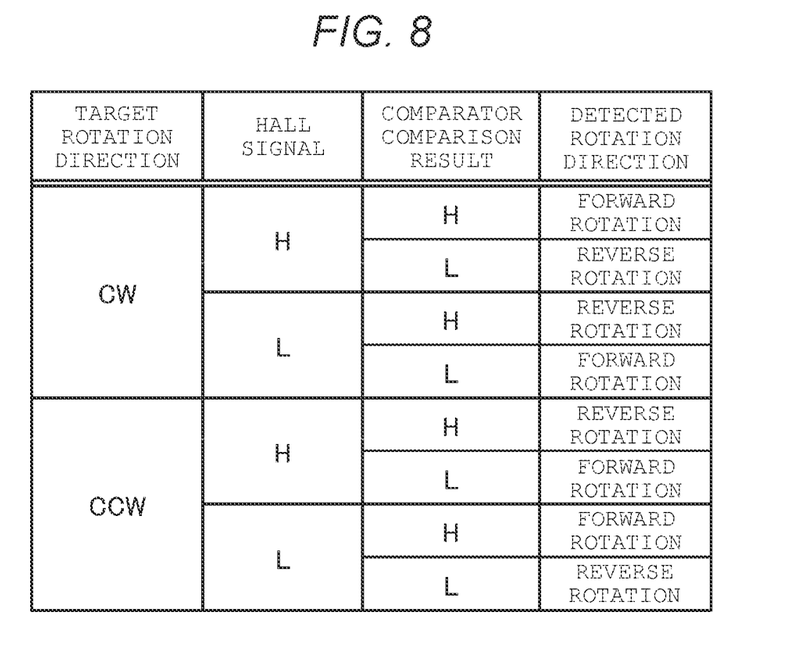
FIG. 8 is a diagram related to processing for detecting a rotation direction when a motor is idling in a second embodiment.

As illustrated in FIGS. 4 and 5, the controller 40 can detect the rotation direction of the motor M while in an idling state according to a combination of a level of a Hall signal VHU and a comparison result (for example, the magnitude relationship between the W-phase induced voltage VW and the U-phase induced voltage VU) from the comparator 31. The controller 40 may detect the rotation direction of the motor M during idling, as illustrated in FIG. 8. FIG. 8 is a diagram illustrating processing for detecting the rotation direction when the motor M is idling.

For example, when a target (intended) rotation direction is the rotation direction CW, if the Hall signal VHU is at H level and the comparison result is at H level (that is, VW>VU), the controller 40 determines that the rotation direction is a "forward rotation" direction with respect to the target direction because the motor M is rotating in the rotation direction CW (see FIG. 4).

When the Hall signal VHU is at H level and the comparison result is at L level (that is, VW<VU), the controller 40 determines that the rotation direction is a "reverse rotation" direction with respect to the target direction because the motor M is rotating in the rotation direction CCW (see FIG. 5).

When the Hall signal VHU is at L level and the comparison result is at H level (that is, VW>VU), the controller 40 determines that the rotation direction is the "reverse rotation" direction with respect to the target direction because the motor M is rotating in the rotation direction CCW during the idling state (see FIG. 5).

When the Hall signal VHU is at L level and the comparison result is at L level (that is, VW<VU), the controller 40 determines that the rotation direction is the "forward rotation" direction with respect to the target direction because the motor M is rotating in the rotation direction CW during the idling state (see FIG. 5).

Alternatively, when a target rotation direction is the rotation direction CCW, if the Hall signal VHU is at H level and the comparison result is at H level (that is, VW>VU), the controller 40 determines that the rotation direction is the "reverse rotation" direction with respect to the target direction because the motor M is rotating in the rotation direction CW (see FIG. 4).

When the Hall signal VHU is at H level and the comparison result is at L level (that is, VW<VU), the controller 40 determines that the rotation direction is the "forward rotation" direction with respect to the target direction because the motor M is rotating in the rotation direction CCW (see FIG. 5).

When the Hall signal VHU is at L level and the comparison result is at H level (that is, VW>VU), the controller 40 determines that the rotation direction is the "forward rotation" direction with respect to the target direction because the motor M is rotating in the rotation direction CCW (see FIG. 5).

When the Hall signal VHU is at L level and the comparison result is at L level (that is, VW<VU), the controller 40 determines that the rotation direction is the "reverse rotation" direction with respect to the target direction because the motor M is rotating in the rotation direction CW (see FIG. 5).

In the second embodiment, the controller 40 in the motor control device 1 calculates the present rotational direction of the motor M based on the signal from the sensor 20 and the detection result from the detection circuit 30. The controller 40 detects the rotational direction of the motor M when the motor M is idling according to a combination of the level of the Hall signal VHU and the comparison result (for example, the magnitude relationship between the W-phase induced voltage VW and the U-phase induced voltage VU) of the comparator 31. As a result, the rotational direction of the motor M during idling can be properly determined, and the motor M can be more effectively drive-controlled in the proper rotation direction when the idling state ends.

It would be possible to detect the rotational direction of the motor M during idling from a Hall signal of one phase and the polarity of the current flowing in a lower output stage of the one phase. For example, if the upper switching element SWVU of the V phase in the drive circuit 10 is turned off and the lower switching element SWVL is turned on, and the rotation direction of the motor M could be detected from the level of the U-phase Hall signal and the polarity of the U-phase induced voltage. In this case, a braking operation on the rotation of the rotor RT occurs due to turning-on of the switching element SWVL. Therefore, the U-phase induced voltage may change and the polarity may change. As a result, the rotation direction of the motor M might be erroneously detected.

According to the second embodiment, the controller 40 calculates the rotation direction of the motor M based on the signal from the sensor 20 and the detection result from the detection circuit 30. As a result, the rotation direction of the motor M when it is idling can be properly determined, and the motor M can be drive-controlled in the proper rotation direction.

Third Embodiment

Next, the motor control device 1i according to a third embodiment will be described. The following description will focus on parts that are different from those of the first and second embodiments.

In the first embodiment, the offset amount and the delay amount are calculated as part of the adjustment processing that is performed separately from the normal driving. In the second embodiment, the rotation direction is detected when the motor M is idling (not being actively driven). In the third embodiment, the phase of the driving voltage of the motor M is adjusted.

The phase of the induced voltage of the motor M and the phase of the motor current may deviate from each other. For example, in the case of FIG. 3, there is a deviation corresponding to a timing deviation Δt between the phase of the induced voltage of the motor M and the phase of the motor current. If the phase of the induced voltage of the motor M and the phase of the motor current can be matched, the power efficiency of driving of the motor M will generally be improved.

Therefore, in the motor control device 1i illustrated in FIG. 6, the controller 40 adjusts the phase of the driving voltage of the motor M based on the signal from the sensor 20 and the detection result from the detection circuit 30i.

Figure 9:
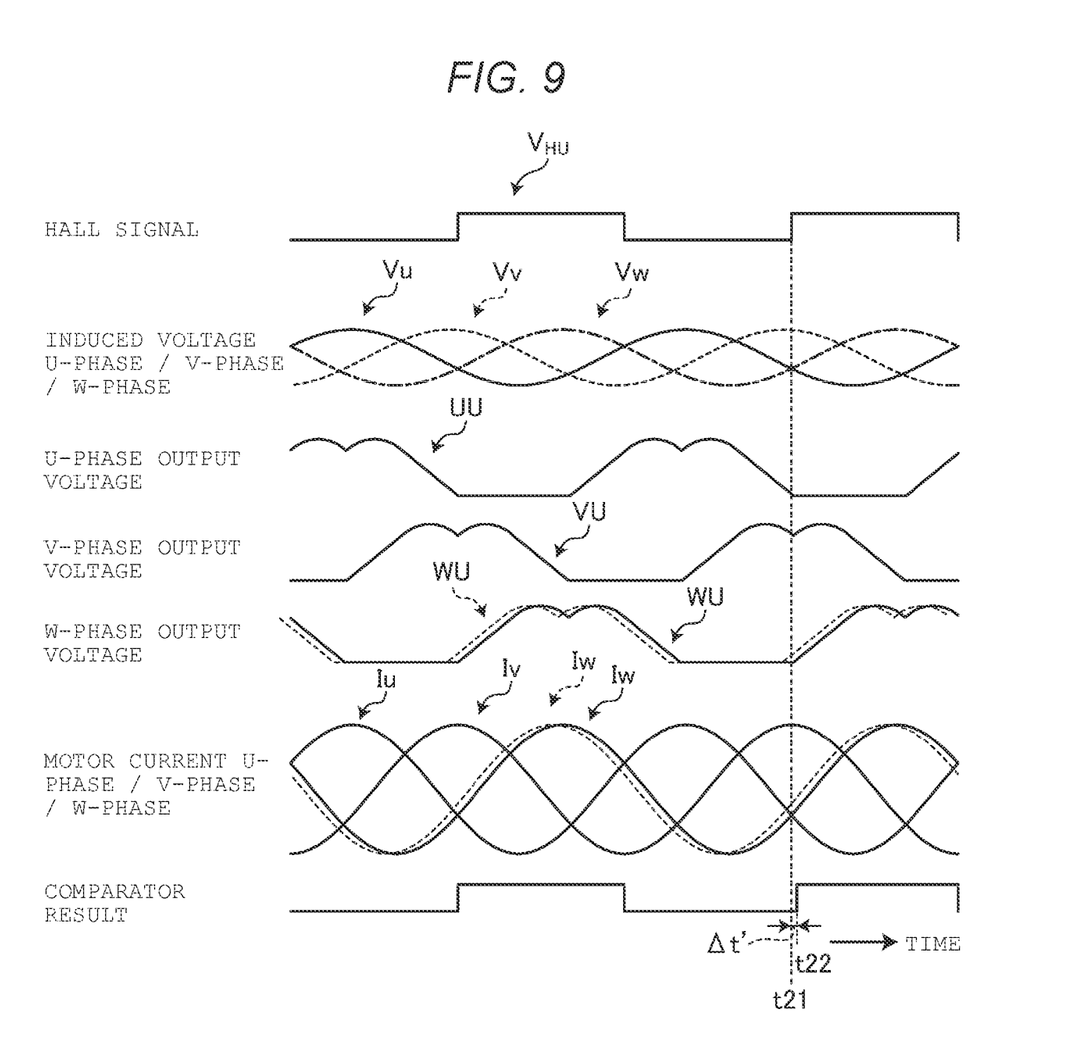
FIG. 9 is a waveform diagrams illustrating an operation of a motor control device according to a third embodiment.

After the offset amount/delay amount has been adjusted, the control circuit 41 may drive-control the motor M as if in the normal operating state. For example, the control circuit 41 may drive-control the motor M in the rotation direction CW. The control circuit 41 supplies a U-phase output voltage UU, a V-phase output voltage VU, and a W-phase output voltage WU as illustrated in FIG. 9 to control terminals of switching elements SWUU, SWVU, and SWWU, respectively. Similarly, the control circuit 41 can supply, a U-phase output voltage UL, a V-phase output voltage VL, and a W-phase output voltage WL to control terminals of switching elements SWUL, SWVL, and SWWL, respectively. FIG. 9 is a waveform diagram illustrating an operation of the motor control device 1i.

In this operating state, the sensor 20 detects the rotation position of the rotor RT and supplies the detection result to the processing circuit 42. For example, the Hall element H supplies a Hall signal VHU as illustrated in FIG. 9 to the processing circuit 42. A level of the Hall signal VHU output from the Hall element H changes when the magnetic pole boundary of the rotor RT passes through the sensor position between the two phase windings Wu and Ww. For example, the hall signal VHU transitions from L level to H level at a time t21.

The detection circuit 30i detects the timing at which the magnitude relationship between the motor current of one phase and the motor current of another phase is switched, and supplies the detection result to the processing circuit 42. The comparator 31 compares a W-phase motor current IW and a U-phase motor current IU, and inverts (switches) the comparison result when the magnitude relationship between the amplitude of the W-phase motor current IW and the amplitude of the U-phase motor current IU is switched. For example, the comparison result from the comparator 31 transitions from L level to H level at a time t22.

The processing circuit 42 obtains the time t21 according to the Hall signal VHU from the sensor 20. The processing circuit 42 obtains the time t22 according to the comparison result from the detection circuit 30i. Based on these times, the processing circuit 42 calculates a period Δt' (time from t21 to t22). The processing circuit 42 notifies the control circuit 41 of the calculated period Δt'. The period Δt' indicates that the phase of the motor current deviates from the phase of the induced voltage of the motor M in a timing delaying direction.

The control circuit 41 selectively advances the W-phase output voltages WU and WL by an electrical angle corresponding to the period Δt'. The control circuit 41 selectively advances the W-phase output voltages WU and WL as indicated by the dotted vertical line in FIG. 9 while maintaining the U-phase output voltages UU and UL and the V-phase output voltages VU and VL. As a result, the W-phase motor current IW is selectively advanced while the U-phase motor current IU and the V-phase motor current IV are maintained. Thereby, the phase of the induced voltage of the motor M and the phase of the motor current can be matched.

Although not specifically illustrated, when it is detected that the phase of the motor current deviates in a timing advancing direction from the phase of the induced voltage of the motor M by a period Δt", the control circuit 41 may selectively advance the W-phase output voltages WU and WL by an electrical angle corresponding to the period Δt". This also makes it possible to match the phase of the induced voltage of the motor M with the phase of the motor current.

Figure 10:
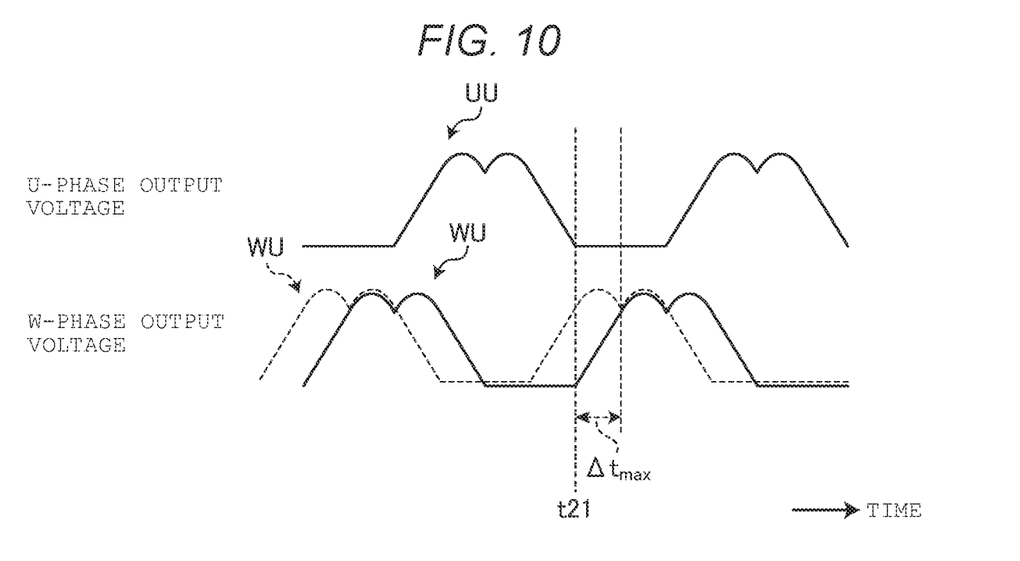
FIG. 10 is a waveform diagram illustrating a phase adjustment range on an advancement angle side in a third embodiment.

As for the possible range of phase adjustment, as illustrated in FIG. 10, levels of the output voltages of the two phases (in this case, the U phase and the W phase) used for control are close to each other in the vicinity of the time t21 at which the Hall signal VHU rises. Therefore, when selectively advancing one phase (for example, the W phase) in a range in which the balance of the three phases (the U phase, the V phase, and the W phase) can be maintained, an advancement angle value can be up to an electrical angle of 60° at most regardless of the magnitude of the amplitude. That is, the controller 40 can adjust a deviation between the phase of the induced voltage of the motor M and the phase of the motor current up to a period Δtmax. Also, when selectively delaying one phase (for example, the W phase), a delayed angle value can be up to −50°. As a result, the controller 40 can adjust the phase of the induced voltage of the motor M and the phase of the motor current in an electrical angle range of −50° to 60°.

In the third embodiment, in the motor control device 1i, the controller 40 adjusts the phase of the driving voltage of the motor M based on the signal from the sensor 20 and the detection result from the detection circuit 30i. Thereby, the power efficiency of driving the motor M can be improved.

It is possible to adjust the advancement angle amount so that a difference between switching of the Hall signal of one phase and a polarity of the current flowing when a lower output stage of the one phase is turned on becomes 30° in an electrical angle. In such a case, when a duty ratio of the driving voltage (for example, the V-phase output voltage VU) of the one phase becomes high, it tends to be difficult to turn on the lower output stage. Therefore, the phase adjustable range tends to be limited near a center of the H level of the driving voltage of one phase. For example, the phase adjustable range may be limited to an electrical angle of −30° to 30°.

However, according to the present embodiment, a timing difference is detected by the rising edge of a Hall signal of one phase and the switching in the magnitude relationship of the motor currents of two phases, and the driving voltage of one phase is adjusted by the phase amount corresponding to the detected timing difference. Thereby, the phase adjustment can be performed over a wide range of electrical angles, and the robustness of the phase adjustment can be improved. For example, the phase adjustable range can be expanded to an electrical angle range of −50° to 60°.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A motor control device, comprising:
a sensor at a position between a winding for a first phase and a winding for a second phase in a motor including the winding of the first phase, the winding of the second phase, and a winding of a third phase;
a detection circuit configured to detect a timing at which a magnitude relationship between a signal of the first phase and a signal of the second phase is switched; and
a controller configured to perform processing based on a sensor signal from the sensor and a detection result signal from the detection circuit, wherein
the controller is configured to:
calculate an offset of the position of the sensor from the midpoint position between the winding of the first phase and the winding of the second phase based on the sensor signal and the detection result signal, and
calculate a delay amount of an edge timing of the sensor signal from a proper timing based on the sensor signal and the detection result signal.

2. The motor control device according to claim 1, wherein the detection circuit detects when a magnitude relationship between an induced voltage amplitude of the first phase and an induced voltage amplitude of the second phase is switched and outputs the detection result signal accordingly.

3. The motor control device according to claim 1, wherein the detection circuit detects when a magnitude relationship between a motor current of the first phase and a motor current of the second phase is switched and outputs the detection result signal accordingly.

4. The motor control device according to claim 1, further comprising:
a drive circuit connected between the controller and the motor and including a plurality of switching elements.

5. The motor control device according to claim 4, wherein the controller is configured to:
control the drive circuit to drive the motor in a first rotation direction while maintaining all of the plurality of switching elements in the OFF state to measure a first delay time in the first rotation direction, and
control the drive circuit to drive the motor in a second rotation direction while maintaining all of the plurality of switching elements in the OFF state to measure a second delay time in the second rotation direction.

6. The motor control device according to claim 5, wherein the controller uses the first delay time and the second delay time for calculating the offset amount and the delay amount.

7. A motor control device, comprising:
a sensor at a position between a winding for a first phase and a winding for a second phase in a motor including the winding of the first phase, the winding of the second phase, and a winding of a third phase;
a detection circuit configured to detect a timing at which a magnitude relationship between a signal of the first phase and a signal of the second phase is switched; and
a controller configured to perform processing based on a sensor signal from the sensor and a detection result signal from the detection circuit, wherein
the controller is configured to adjust a phase of a driving voltage of the motor based on the sensor signal and the detection result signal.

8. The motor control device according to claim 7, wherein the controller adjusts the phase of the driving voltage of the motor by up to an electrical angle of 60°.

9. A motor driver circuit for supplying a motor with 3-phase AC power, the motor driving circuit comprising:
- a first high-side switch connected in series with a first low-side switch between a first power supply terminal and a second power supply terminal;
- a second high-side switch connected in series with a second low-side switch between the first power supply terminal and the second power supply terminal;
- a third high-side switch connected in series with a third low-side switch between the first power supply terminal and the second power supply terminal;
- a first node between the first high-side switch and the first low-side switch and connected to a first winding of a motor;
- a second node between the second high-side switch and the second low-side switch and connected to a second winding of the motor;
- a third node between the third high-side switch and the third low-side switch and connected to a third winding of the motor;
- a detection circuit connected to the first and second nodes and configured to output a detection result signal indicating when a magnitude relationship between a first voltage signal at the first node and a second voltage signal at the second node switches; and
- a controller configured to receive the detection result signal from the detection circuit and a sensor signal from a sensor at a position between the first winding and the second winding and perform processing to calculate an offset between the position of the sensor and the actual midpoint position between the first and second windings and based on the sensor signal and a detection result signal and to calculate a delay amount of an edge timing of the sensor signal from a proper timing.

10. The motor driver circuit according to claim 9, wherein the detection circuit detects an induced voltage amplitude at the first node and an induced voltage amplitude at the second node.

11. The motor driver circuit according to claim 9, wherein the detection circuit detects a motor current at the first node and a motor current at the second node.

12. The motor driver circuit according to claim 9, wherein the controller is configured to:
- calculate an offset of the position of the sensor from the midpoint position between the first winding and the second winding based on the sensor signal and the detection result signal, and
- calculate a delay amount of an edge timing of the sensor signal from a proper timing based on the sensor signal and the detection result signal.

13. The motor driver circuit according to claim 9, wherein the controller is configured to:
- drive the motor in a first rotation direction to measure a first delay time in the first rotation direction, and
- drive the motor in a second rotation direction to measure a second delay time in the second rotation direction.

14. The motor driver circuit according to claim 13, wherein the controller uses the first delay time and the second delay time for calculating the offset amount and the delay amount.

15. The motor driver circuit according to claim 9, wherein the controller is configured to identify a rotation direction of the motor based on the sensor signal and the detection result signal.

16. The motor driver circuit according to claim 9, wherein the controller is configured to adjust a phase of a driving voltage of the motor based on the sensor signal and the detection result signal.

17. The motor driver circuit according to claim 16, wherein the controller adjusts the phase of the driving voltage of the motor by up to an electrical angle of 60°.

18. A motor driver circuit, comprising:
- a processing circuit connectable to a sensor in a motor having a winding of a first phase, a winding of a second phase, a winding of a third phase, and a rotor, the sensor being at a position between the winding of the first phase and the winding of the second phase, the processing circuit being configured to, while the rotor is being rotated at a substantially constant speed, detect an offset between the position of the sensor and the midpoint position between the winding of the first phase and the winding of the second phase and calculate a delay amount between a proper timing and an edge timing of a signal output from the sensor corresponding to a rotational speed of the rotor.

* * * * *